(12) United States Patent
Quinebeche et al.

(10) Patent No.: US 12,018,140 B2
(45) Date of Patent: Jun. 25, 2024

(54) FLEXIBLE FIRE-RETARDANT THERMOPLASTIC COMPOSITIONS HAVING HIGH THERMOMECHANICAL STRENGTH, IN PARTICULAR FOR ELECTRIC CABLES

(71) Applicant: SG GLOBAL CHEMICAL CO., LTD., Seoul (KR)

(72) Inventors: Sébastien Quinebeche, Bernay (FR); Vincent Palluault, Evreux (FR); Benoît Savignat, Bernay (FR)

(73) Assignee: SK GEO CENTRIC CO., LTD., Seoul (KR)

( * ) Notice: Subject to any disclaimer, the term of this patent is extended or adjusted under 35 U.S.C. 154(b) by 0 days.

(21) Appl. No.: 14/909,756

(22) PCT Filed: Jul. 9, 2014

(86) PCT No.: PCT/FR2014/051756
§ 371 (c)(1),
(2) Date: Feb. 3, 2016

(87) PCT Pub. No.: WO2015/018995
PCT Pub. Date: Feb. 12, 2015

(65) Prior Publication Data
US 2016/0185942 A1 Jun. 30, 2016

(30) Foreign Application Priority Data
Aug. 6, 2013 (FR) ...................... 1357805

(51) Int. Cl.
| | | |
|---|---|---|
| C08L 23/06 | (2006.01) |
| C08K 3/22 | (2006.01) |
| C08L 23/04 | (2006.01) |
| C08L 23/08 | (2006.01) |
| C08L 51/06 | (2006.01) |
| C09K 21/02 | (2006.01) |
| F16L 9/12 | (2006.01) |
| H01B 3/44 | (2006.01) |
| H01B 7/295 | (2006.01) |

(52) U.S. Cl.
CPC ............. *C08L 23/06* (2013.01); *C08K 3/22* (2013.01); *C08L 23/04* (2013.01); *C08L 23/0853* (2013.01); *C08L 51/06* (2013.01); *C09K 21/02* (2013.01); *F16L 9/12* (2013.01); *H01B 3/441* (2013.01); *H01B 7/295* (2013.01); *C08K 2003/2227* (2013.01); *C08L 2201/02* (2013.01); *C08L 2201/08* (2013.01); *C08L 2203/18* (2013.01); *C08L 2203/202* (2013.01); *C08L 2205/03* (2013.01); *C08L 2207/066* (2013.01)

(58) Field of Classification Search
CPC ...... C08L 23/0853; C08L 23/04; C08L 23/06; C08L 23/02; C08L 51/06; C08L 2201/02; C08L 2201/08; C08L 2203/18; C08L 2203/202; C08L 2205/03; C08L 2207/066; C08K 3/22; C08K 2003/2227; C09K 21/02; F16L 9/12; H01B 3/441; H01B 7/295
See application file for complete search history.

(56) References Cited

U.S. PATENT DOCUMENTS

| | | | |
|---|---|---|---|
| 4,644,044 A | 2/1987 | Gloriod et al. | |
| 5,698,323 A * | 12/1997 | Keough | H01B 7/295 174/110 A |
| 5,872,201 A * | 2/1999 | Cheung | C08F 10/00 526/280 |
| 6,107,385 A | 8/2000 | Imahashi | |
| 6,232,377 B1 * | 5/2001 | Hayashi | C08K 3/24 524/100 |
| 6,303,681 B1 | 10/2001 | Furukawa et al. | |
| 6,617,366 B2 | 9/2003 | Sueda et al. | |
| 8,980,983 B2 | 3/2015 | La Rosa et al. | |
| 2009/0130356 A1 * | 5/2009 | Moriuchi | C08L 23/02 428/36.9 |

(Continued)

FOREIGN PATENT DOCUMENTS

| | | |
|---|---|---|
| CN | 101747551 A | 6/2010 |
| CN | 102459443 A | 5/2012 |

(Continued)

OTHER PUBLICATIONS

Google definition for "plasticizer", obtained on Jun. 2019.*

(Continued)

*Primary Examiner* — Holly Rickman
*Assistant Examiner* — Lisa Chau
(74) *Attorney, Agent, or Firm* — BUCHANAN, INGERSOLL & ROONEY PC

(57) ABSTRACT

A halogen-free fire-retardant thermoplastic composition composed of: 50% to 70% by weight of fire-retardant fillers, 0.1% to 45% by weight of a copolymer of ethylene and of an ethylenic monomer bearing a polar function, 10% to 25% by weight of a non-functionalized very low density polyethylene (VLDPE), optionally, up to 10% of additives, and 0.1% to 10% by weight of a linear low density polyethylene (LLDPE), characterized in that the density of the very low density polyethylene (VLDPE) is between 0.85 and 0.91, in that the density of the linear low density polyethylene is greater than 0.91 and in that the linear low density polyethylene (LLDPE) is grafted with maleic anhydride grafts present on the main chain. Also, a cable, tube, pipe or the like, a layer of which is formed with said composition.

8 Claims, No Drawings

(56) References Cited

U.S. PATENT DOCUMENTS

| | | | | | |
|---|---|---|---|---|---|
| 2011/0268979 | A1* | 11/2011 | Ambroise | ............... | C08L 23/04 428/516 |
| 2012/0010346 | A1* | 1/2012 | La Rosa | ................. | C08L 23/02 524/424 |
| 2012/0108758 | A1* | 5/2012 | Laignel | ................. | C08J 3/2053 525/330.3 |

FOREIGN PATENT DOCUMENTS

| | | | | | |
|---|---|---|---|---|---|
| CN | 102101922 | B | | 8/2012 | |
| CN | 102159632 | B | | 11/2013 | |
| EP | 0 953 599 | A1 | | 11/1999 | |
| EP | 1 092 751 | A1 | | 4/2001 | |
| EP | 2275477 | A1 | * | 1/2011 | ............ H01B 3/447 |
| EP | 2275477 | B1 | | 12/2011 | |
| FR | 2 498 609 | A1 | | 7/1982 | |
| FR | 2 569 411 | A1 | | 2/1986 | |
| FR | 2 569 412 | A1 | | 2/1986 | |
| FR | 2 870 542 | A1 | | 11/2005 | |
| FR | 2 985 731 | A1 | | 7/2013 | |
| JP | H07-278370 | A | | 10/1995 | |
| JP | 2000-239459 | A | | 9/2000 | |
| JP | 2010-520937 | A | | 6/2010 | |
| WO | WO-2005092975 | A1 | * | 10/2005 | ............... C08K 3/22 |
| WO | 2008112393 | A1 | | 9/2008 | |

OTHER PUBLICATIONS

Google definition for "plastomer", obtained on Jun. 2019.*
Evatane main properties and technical data sheets, obtained on Dec. 2019.*
Definition of "Breaking Stress" provided by Corrosionpedia (2018).*
Office Action (Notification of the Second Office Action) issued on Sep. 5, 2017, by the State Intellectual Property Office (SIPO) of the People's Republic of China in corresponding Chinese Patent Application No. 201480055092.1, and an English Translation of the Office Action. (15 pages).
Office Action (Notification of the Third Office Action) issued on May 31, 2018 by the State Intellectual Property Office (SIPO) of the People's Republic of China in corresponding Chinese Patent Application No. 201480055092.1, and an English Translation of the Office Action. (13 pages).
Office Action (Notification of the Fourth Office Action) issued on Jul. 31, 2019, by the State Intellectual Property Office (SIPO) of the People's Republic of China in corresponding Chinese Patent Application No. 201480055092.1, and an English Translation of the Office Action. (10 pages).
Office Action (Desition to Grant a Patent) issued on May 8, 2018, by the Japanese Patent Office in corresponding Japanese Patent Application No. 2016-532714, and an English Translation of the Office Action. (5 pages).
International Search Report (PCT/ISA/210) issued on Oct. 24, 2014, by the Japanese Patent Office as the International Searching Authority for International Application No. PCT/FR2014/051756.
Written Opinion (PCT/ISA/237) issued on Oct. 24, 2014, by the Japanese Patent Office as the International Searching Authority for International Application No. PCT/FR2014/051756.

* cited by examiner

FLEXIBLE FIRE-RETARDANT THERMOPLASTIC COMPOSITIONS HAVING HIGH THERMOMECHANICAL STRENGTH, IN PARTICULAR FOR ELECTRIC CABLES

FIELD OF THE INVENTION

A subject matter of the invention is flexible fire-retardant thermoplastic compositions having high thermomechanical strength. The present invention also relates to the use of this composition as sheathing layer (external layer) in a cable, pipe, or the like, and also as constituent material (internal layer) of a protective sheath.

These compositions are of use in cable manufacturing for insulating and protecting electric cables, optical fibers or pipes for the transportation of fluids, such as liquid refrigerants or oils. In applications such as the sheathing of electric cables, electrical parts, electrical engineering parts, motor vehicles, in addition to their electrically insulating nature, the materials must above all have a high level of resistance to fire (fire retardancy). This is because electrical installations can be the cause of short circuits and can catch fire; they may also be brought in to contact with a flame and thus catch fire and propagate the fire along the cable trays.

Thermoplastic polymers, such as polyethylenes, polyamides or their mixtures, are good electrical insulators and are easy to process. They are used to prepare electrical housings and connectors and also cable sheathings.

The fire-retardant qualities of a composition are conventionally measured by the Limiting Oxygen Index or LOI test. The measurement of the limiting oxygen index makes it possible to determine the minimum oxygen concentration in an oxygen/nitrogen mixture which makes it possible to maintain the combustion of a plastic in the vertical position with ignition at the top of the sample. The flammability of the materials is thus quantitatively characterized.

For a result in the LOI test of less than 10%, the composition burns very easily. For results in the LOI test of between 21% and 30%, the composition burns but extinguishes by itself after a more or less long period of time. In the field of cable manufacturing, for the fire-retardant layer (a cable generally being formed of a plurality of parallel layers), the result in the LOI test must not be less than 35%, which corresponds to spontaneous or immediate extinction of the combustion of the composition.

There exist different additives for rendering a plastic nonflammable, some based on halogenated products, and others devoid of halogen.

The use of halogenated derivatives exhibits the great disadvantage of resulting, during combustion, in toxic and corrosive gases. Thus, as is the case in the context of the present invention, manufacturers and transformers then turned toward the development of compositions comprising oxides, hydroxides or inorganic salts of metals, such as aluminum and magnesium hydroxides. The addition of these materials confers fire-retardant properties but damages the mechanical properties of the thermoplastic composition in which they are included.

In addition to the resistance to fire, which is a prerequisite for these fire-retardant compositions in cable manufacturing, these compositions have to exhibit optimum mechanical qualities.

In point of fact, once the objectives related to the absence of combustion (or the very slight combustion) of the thermoplastic compositions forming all or part of a pipe, cable or the like have been solved, the latter have to exhibit mechanical and thermomechanical properties (mechanical properties during sizeable thermal overheating).

As the fire-retardant fillers are present in large amounts, in order to satisfy the fire-retardant properties of the pipe, cable or the like, it is necessary for the matrix (including the fillers) to confer the maximum of flexibility on the composition, it being understood that the fire-retardant fillers tend to stiffen said composition.

Conventionally, in order to confer flexibility on a thermoplastic composition, polyolefins, such as EVA (ethylene/vinyl acetate) copolymers having a very high content of vinyl acetate or else a very-low-density polyethylene, are added thereto.

Unfortunately, the incorporation of polyolefins of this type has the consequence of lowering the melting point of the thermoplastic composition and thus of very significantly damaging the thermomechanical properties.

Thus, starting from a thermoplastic composition including a very high content of fillers, having as consequence significant stiffening, the search for flexibility for this composition necessarily takes place to the detriment of the thermomechanical properties.

There currently do not exist, on the market, thermoplastic compositions exhibiting high performance characteristics for all of these combined properties (flexibility, thermomechanical properties and fire-retardant properties).

State of the Art

There is currently known a fire-retardant polymer composition comprising a copolymer of ethylene comprising polar groups chosen from the group consisting of acrylic acids, methacrylic acids, acrylates, methacrylates, acetates and vinyl acetates; a copolymer of ethylene prepared with a single-site catalyst having a density of between 0.860 and 0.910 grams per cubic centimeter ($g/cm^3$); an inorganic filler devoid of halogen comprising a huntite and/or a hydromagnesite and a homopolymer or copolymer of ethylene modified with maleic anhydride.

There is also known a fire-retardant composition for cables, devoid of halogen, prepared from a composition comprising from 3 to 10% by weight of a polyethylene having a low melting point and exhibiting maleic anhydride grafts (mean to high degree of grafting) using a resin based on VLDPE having a density of between 0.86 and 0.91 $g/cm^3$, from 15% to 25% by weight of at least one EEA (Ethylene-Ethyl Acrylate) or EVA, from 5% to 20% by weight of an α-olefin polymer and from 40% to 65% by weight of an inorganic flame-retardant agent. This composition corresponds substantially to the "DM2" composition tested below by the proprietor.

In addition, there is known a fire-retardant composition, having a high inorganic charge, comprising an olefinic multiblock interpolymer and a compatibilizing agent based on a polar monomer.

There is also known a fire-retardant composition (comprising fire-retardant fillers) comprising four components, namely an EVA (ethylene-vinyl acetate) copolymer, a very-low-density polyethylene, another very-low-density polyethylene grafted with maleic anhydride and a linear low-density polyethylene. This composition corresponds substantially to the composition denoted "DM1" in the tests presented below.

Finally, the document FR 2 985 731 is known, which discloses a fire-retardant thermoplastic composition (example 9 of said document) comprising:
  63% by weight of aluminum trihydrate,
  22.75% by weight of EVA,
  9% by weight of non-functionalized LLDPE, 5% by weight of an LLDPE grafted with maleic anhydride grafts, and 0.25% by weight of an antioxidant.

Such a composition is much too hard (cf. example DM12 below) and, if the non-functionalized LLDPE is replaced with a VLDPE, contrary to teachings of a person skilled in the art relating to the thermomechanical qualities of the composition, such a composition still remains too hard (cf. example DM8 with a Shore D at 43).

Compositions disclosed in the documents FR 2 870 542, EP 0 953 599 and EP 1 092 751 are also known.

All these fire-retardant compositions can be satisfactory in some applications but either they do not satisfy all of the high-performance characteristics for all of these combined properties (flexibility, thermomechanical properties and fire-retardant properties) or they are too expensive (cost of the components, cost of the preparation/manufacturing process).

BRIEF DESCRIPTION OF THE INVENTION

After experiments, the applicant company has discovered, surprisingly, that a halogen-free fire-retardant composition combining, in specific proportions and with specific properties, an ethylene-vinyl acetate copolymer, non-functionalized very-low-density polyethylene (VLDPE) and a linear low-density polyethylene grafted with maleic anhydride makes it possible to confer the required flexibility on the fire-retardant composition while retaining or maintaining optimal thermomechanical properties.

The present invention thus intends to overcome the catastrophic decline in the thermomechanical properties of the fire-retardant compositions of the prior art when the flexibility of said compositions is increased by providing a thermoplastic composition which meets two essential requirements of the pipes, cables or the like, namely the flexibility and the thermomechanical strength.

More specifically, the composition desired in the context of the present invention should exhibit an equivalent flexibility to the compositions currently used on the market, this level of flexibility being accepted and satisfactory for all the players in the technical field of pipes, cables or the like.

The thermomechanical properties are measured here via the test, well known to a person skilled in the art, known as the hot pressure test, while the flexibility is measured by the test known as the Shore D test, also well known to a person skilled in the art.

Another test relating to the mechanical properties of the composition was carried out in order to confirm these properties at ambient temperature: it is a conventional tensile test according to the standard ISO R527: 93-1BA.

The present invention thus relates to a halogen-free fire-retardant thermoplastic composition, characterized in that it consists of:

50% to 75% by weight of fire-retardant fillers, 0.1% to 45% by weight of a copolymer of ethylene and of an ethylenic monomer carrying a polar functional group, 10% to 25% by weight of a non-functionalized very-low-density polyethylene (VLDPE), optionally up to 10% by weight of additives, and 0.1% to 10% by weight of a linear low-density polyethylene (LLDPE), characterized in that the density of the very-low-density polyethylene (VLDPE) is between 0.85 and 0.91, in that the density of the linear low-density polyethylene is greater than 0.91 and in that the linear low-density polyethylene (LLDPE) is grafted with maleic anhydride grafts present on the main chain.

With respect to the current solution available on the market, the thermoplastic composition according to the invention makes it possible to use only three thermoplastic components instead of four. In addition to the saving in cost related to these diverse needs sources of supply, the process for the manufacture of the fire-retardant composition is advantageously simplified.

Other advantageous characteristics of the invention are specified subsequently:

advantageously, the abovesaid linear low-density polyethylene (LLDPE) is between 2.5% and 7% by weight of the composition, preferably between 3.5% and 5%;

advantageously, the abovesaid very-low-density polyethylene (VLDPE) represents at most 20% by weight of the composition;

preferably, the ethylenic monomer carrying a polar functional group comprises from 3 to 20 carbon atoms, preferably from 4 to 8 atoms;

preferably, the ethylenic monomer carrying a polar functional group is chosen from saturated carboxylic acid vinyl esters, unsaturated carboxylic acids or unsaturated carboxylic acid (meth)acrylic esters;

advantageously, the fire-retardant agent is an inorganic filler, in particular aluminum trihydroxide and/or magnesium dihydroxide;

the additives are chosen from antioxidants, UV stabilizers, antistatic agents, inorganic fillers, coloring pigments, zeolites and/or "anti-dripping" agents (products based on silicone (PDMS) or fluorinated products, such as PTFE);

according to a preferred alternative form of the invention, the abovesaid fire-retardant fillers represent more than 60% by weight of the composition.

The present invention relates more particularly to a cable or pipe exhibiting at least two layers, at least one layer of which is formed by the abovesaid thermoplastic composition as set out above.

DETAILED DESCRIPTION OF THE INVENTION

The present invention relates to a fire-retardant composition in which are found, in addition to functional additives optionally present, three specific thermoplastic components, the combination of which makes it possible to solve the problems of the fire-retardant compositions of the prior art, in particular in their applications in cables, tubes, pipes or the like.

Of course, the fire-retardant thermoplastic composition according to the invention can optionally comprise one or more other components, in particular of thermoplastic type, but the technical problems defined above are solved with the three specific components alone, so that, in an advantageous embodiment, the composition according to the invention will comprise only these three thermoplastic components, to the exclusion of all other thermoplastic components.

These three thermoplastic components are:

a copolymer of ethylene and of an ethylenic monomer carrying a polar functional group, a non-functionalized polyethylene with a very low density of between 0.85 and 0.91, a linear low-density polyethylene, the density of which is greater than 0.91, grafted with maleic anhydride grafts.

As regards the (non-functionalized) very-low-density polyethylene and the linear low-density polyethylene functionalized by grafting with maleic anhydride, polyethylene is understood to mean homo- or copolymers. Mention may be made, as comonomers, of α-olefins, advantageously those having from 3 to 30 carbon atoms. Examples of α-olefins having from 3 to 30 carbon atoms as optional comonomers comprise propylene, 1-butene, 1-pentene, 3-methyl-1-butene, 1-hexene, 4-methyl-1-pentene, 3-methyl-1-pentene, 1-octene, 1-decene, 1-dodecene, 1-tetradecene, 1-hexadecene, 1-octadecene, 1-eicosene, 1-docosene, 1-tetracosene, 1-hexacosene, 1-octacosene and 1-triacontene. These α-olefins can be used alone or as a mixture of two or of more than two.

The polyethylene can be of metallocene origin. Metallocene polyethylene denotes the polymers obtained by copolymerization of ethylene and of α-olefin, such as, for example, propylene, 1-butene, 1-hexane or 1-octene, in the presence of a single-site catalyst generally consisting of an atom of a metal, which can, for example, be zirconium or titanium, and of two cyclic alkyl molecules bonded to the metal. More specifically, the metallocene catalysts are normally composed of two cyclopentadiene rings bonded to the metal. These catalysts are frequently used with aluminoxanes as cocatalysts or activators, preferably methylaluminoxane (MAO). Hafnium can also be used as metal to which the cyclopentadiene is attached Other metallocenes can include transition metals from Groups IVa, Va and Via. Metals of the lanthanide series can also be used. These metallocene polyethylenes can also be characterized by their ratio Mw/Mn<3 and preferably<2, in which Mw and Mn respectively denote the weight-average molar mass and the number-average molar mass. Metallocene polyethylene also denotes those having an MFR (Melt Flow Ratio) of less than 6.53 and a ratio Mw/Mn of greater than MFR minus 4.63. MFR denotes the ratio of the MFI 10 (MFI under a load of 10 kg) to the MFI 2 (MFI under a load of 2.16 kg). Other metallocene polyethylenes are defined by an MFR equal to or greater than 6.13 and a ratio Mw/Mn of less than or equal to MFR minus 4.63.

Advantageously, the density of the very-low-density polyethylene is between 0.850 and 0.910.

Advantageously, the density of the linear low-density polyethylene functionalized by grafting with maleic anhydride is greater than 0.91.

The grafting of the maleic anhydride to the linear low-density polyethylene is an operation known per se by a person skilled in the art. The degree of grafting of the maleic anhydride, that is to say the number of maleic anhydride monomer units in the grafted polymer, is variable according to the polyethylene under consideration and can vary from 0.1% to 4% by weight, preferably from 0.4% to 2% by weight, of the grafted polymer.

As regards the copolymer of ethylene and of an ethylenic monomer carrying a polar functional group, ethylenic monomer is understood to mean a monomer comprising an unsaturation capable of reacting with ethylene in a radical-route process. Polar functional group is understood to mean a functional group exhibiting a dipole moment, such as the amine, alcohol, urethane, acid or ester functional groups. Preferably, the polar functional group is an acid functional group or an ester functional group.

The ethylenic monomer carrying a polar functional group preferably comprises from 3 to 20 carbon atoms, preferably from 4 to 8 carbon atoms.

Mention may be made, as examples of copolymer, of the copolymers of ethylene and of a carboxylic acid vinyl ester, the copolymers of ethylene and of an unsaturated carboxylic acid or also the copolymers of ethylene and of an alkyl acrylate and/or methacrylate, combined in the present patent application under the term alkyl (meth)acrylate. Advantageously, the ethylenic monomer can be chosen from vinyl acetate and methyl, ethyl or butyl (meth)acrylates.

The amount by weight of ethylenic monomer with respect to the total weight of the copolymer can be within the range extending from 1% to 70%, advantageously from 10% to 60% and preferably from 20% to 45%.

According to the invention, the amounts of the different monomers present in the copolymer can be measured by infrared spectroscopy using the standard ISO 8985 (1998). The softening temperature of the copolymer can be measured by the standard ASTM E 28-99 (2004).

Use may be made of the processes described as radical polymerization normally operating at pressures between 200 and 2500 bar. These processes are carried out industrially using two main types of reactors: a reactor of autoclave type or a reactor of tubular type. These polymerization processes known to a person skilled in the art and use may be made, for example, of the processes described in the documents FR 2 498 609, FR 2 569 411 and FR 2 569 412. A person skilled in the art knows in what proportions to use each of the monomers in order to obtain the copolymer, of ethylene and of an ethylenic monomer carrying a polar functional group, used in the invention.

These copolymers are sold by the applicant company under the Evatane® and Lotryl® brands.

As regards the fire-retardant agent, in the context of the examples chosen in order to illustrate the invention, that is to say the carrying out of the tests on the compositions according to the invention with regard to those according to the prior art, two inorganic flame-retarders (fire-retardants) conventionally used have been chosen, namely aluminum trihydroxide (ATH) and, optionally as replacement or as supplement, magnesium dihydroxide (MDH).

Inorganic fire-retardants are thus preferred in the composition according to the invention.

Nevertheless, it will also be possible to regard the fire-retardant agent as corresponding to the definition of the compounds capable of forming, during combustion, acids such as $H_3PO_4$ (orthophosphoric acid), $(HPO_3)_n$ (metaphosphoric acid) and $H_4P_2O_7$ (pyrophosphoric acid). Mention may be made, by way of illustration of such agents, of ammonium phosphates, phosphinates, pyrophosphates and polyphosphates, melamine phosphates, melamine phosphite, piperazine phosphite and diphosphite, guanazole phosphate, melamine pyrophosphate and piperazine pyrophosphate.

Use may also be made of ammonium polyphosphates, which are single-chain polymers of general formula $(NH_4)_{n+2} P_nO_{3n+1}$, in which n represents an integer greater than or equal to 2. The ammonium polyphosphate can be encapsulated in a melamine-based resin. It would not be departing from the scope of the invention to use a mixture of the abovementioned fire-retardant agents. The fire-retardant agent can be functionalized; for example, it can carry silane functional groups.

The fire-retardant of the composition according to the invention can also consist of a nitrogen-comprising flame retardant. It will then be chosen from pure melamine, melamine derivatives, such as salts of organic or inorganic acids, such as boric acid, cyanuric acid, phosphoric acid or pyro/polyphosphoric acid, or melamine homologs, such as melam or melem.

The fire-retardant of the composition can consist of compounds comprising boron (borates, mixtures of boric acids and of borax, zinc borate, and the like), antimony trioxide, zinc compounds (zinc sulfides, zinc hydroxystannate, and the like), intumescent mixtures (for example, mixture of ammonium polyphosphates, pentaerythritol, melamine derivatives), expandable graphite or nanocomposites (for example, aluminum silicate clay, such as montmorillonite).

Finally, it should be noted that the composition according to the invention optionally comprises red phosphorus, conventionally used as a mixture in polyolefins.

Thus, the fire-retardant of the composition according to the invention is one of the products targeted above or a combination of these products.

Preparation of the Composition:

The compositions according to the invention can be prepared according to a single-stage process during which the ingredients are mixed in order to give a homogeneous composition and to carry out the possible chemical reactions between components. These compositions can be prepared by mixing the different constituents by the conventional means for processing thermoplastics having high loads of fillers, such as, for example, extrusion or kneading. Use may be made of an internal mixer, a co-kneader or a corotating twin-screw extruder. Preferably, the compositions are prepared at a temperature greater than or equal to the melting point of the constituents and less than the temperature at which the fire-retardant agent begins to decompose.

Fillers, in particular inorganic fillers, can be added in order to improve the thermomechanical strength of the composition. Without implied limitation, silica, alumina, talc or calcium carbonates or carbon nanotubes will be given as examples. Advantageously, use is made of modified or unmodified clays which are mixed in the nanometric region, this being done in order to satisfy the requirements of some standards for nonflammability of plastics, such as UL94-V0 (self-extinguishing in 10 seconds maximum, without inflamed drip).

Plasticizers can be added in order to facilitate the processing and to improve the productivity of the process for the manufacture of the composition and structures. Mention may be made, as examples, of paraffinic, aromatic or naphthalenic mineral oils. Mention may also be made, as plasticizer, of phthalates, azelates, adipates or tricresyl phosphate.

Neither would it be departing from the scope of the invention to add "anti-dripping" agents to the compositions, such as products based on silicone (PDMS) or fluorinated products, such as PTFE.

Achievement of the Test Formulations:

The formulations described below are prepared by extrusion by virtue of a co-kneader of Büss PR46 brand, with a diameter of 46 millimeters and a length 15 times its diameter, equipped with a single take-up screw with a diameter of 70 millimeters. The screw and the barrels of the co-kneader are respectively heated at 100° C. and 110° C., while the single take-up screw is heated at 150° C. The extrusion flow rate is 15 kg/h (kilograms per hour) for a rotational speed of the co-kneader of 285 revs/min (revolutions per minute). The different constituents (with the exception of the fire-retardant filler) are introduced into the first hopper (hopper 1) and the fire-retardant filler is introduced in equal parts into hoppers 1 and 2.

Apart from this application in cable manufacturing, the fire-retardant thermoplastic composition according to the invention has other applications where its character of resistance to fire and its good mechanical, thermomechanical and flexibility properties are required. These compositions have the advantage of being transformable into industrial articles (sheets, plaques, profiled elements, hollow bodies, pipes) exhibiting an improved resistance to fire by conventional techniques for the transformation of polyolefins (extrusion, injection molding, rotational molding).

Materials Employed in Order to Form the Test Formulations:

ATH: Aluminum trihydroxide having a specific surface of 4 $m^2$/g.

Orevac® 18340: Linear low-density polyethylene grafted with maleic anhydride, denoted LLDPE-g-MA, produced by Arkema, having an MFI (190° C., 2.16 kg, measured according to ISO 1133) of 3 g/10 min and a density of 0.918.

Evatane® 28-03: Copolymer of ethylene and of vinyl acetate (28% by weight), denoted EVA, produced by Arkema, having an MFI (190° C., 2.16 kg, measured according to ISO 1133) of 3 g/10 min.

LLDPE: Linear low-density polyethylene having an MFI (190° C., 2.16 kg, measured according to ISO 1133) of 1 g/10 min and a density of 0.921.

VLDPE: Very-low-density polyethylene having an MFI (190° C., 2.16 kg, measured according to ISO 1133) of 1 g/10 min and a density of 0.870.

Fusabond® N525: Very-low-density polyethylene grafted with maleic anhydride, denoted VLDPE-g-MA, produced by DuPont, having a density of 0.88.

Antioxidant: Antioxidant, for example of phenolic type.

The present invention is illustrated in more detail by the following nonlimiting examples. The compositions below, whether they are specific to the invention or according to the prior art, comprise exactly the same content or percentage by weight of fire-retardant fillers in the composition, in order not to distort the results of the tests. A percentage by weight of 63% of fire-retardant fillers (with respect to the total weight of the composition under consideration) is chosen in all the test compositions below, this value corresponding substantially to the normal value for fire-resistant fillers.

Furthermore, in order to compare the examples of the invention with respect to other fire-retardant thermoplastic compositions (examples 1 to 4), the following composition examples were provided for the tests, it being understood that the results given below are not exhaustive and that studies in the laboratory and pre-industrially have made it possible to more precisely determine the fire-retardant thermoplastic composition according to the invention, and also its preferred alternative forms.

EXAMPLE 1 the composition entitled "DM1" is a formulation according to the prior art. It comprises, as percentage by weight, 19% of EVA, 10% of VLDPE, 4% of LLDPE and 4% of VLDPE-grafted-MA.

EXAMPLE 2 the composition entitled "DM2" is a formulation according to the prior art. It comprises, as percentage by weight, 23% of EVA, 10% of VLDPE and 4% of VLDPE-grafted-MA.

EXAMPLE 3 the composition entitled "DM3" is a formulation not coming within the scope of the present invention, this composition not comprising LLDPE-g-MA. It comprises, as percentage by weight, 23% of EVA and 14% of VLDPE.

EXAMPLE 4 the composition entitled "DM4" is a formulation not coming within the scope of the present invention, this composition comprising an LLDPE not functionalized by grafting with maleic anhydride. It comprises, as percentage by weight, 19% of EVA, 14% of VLDPE and 4% of LLDPE.

EXAMPLE 5 the composition entitled "DM5" is a formulation coming within the scope of the present invention. It comprises, as percentage by weight, 19% of EVA, 14% of VLDPE and 4% of LLDPE-g-MA.

EXAMPLE 6 the composition entitled "DM6" is a formulation coming within the scope of the present invention. It comprises, as percentage by weight, 15% of EVA, 18% of VLDPE and 4% of LLDPE-g-MA.

EXAMPLE 7 the composition entitled "DM7" is a formulation coming within the scope of the present invention. It comprises, as percentage by weight, 12% of EVA, 22% of VLDPE and 3% of LLDPE-g-MA.

EXAMPLE 8 the composition entitled "DM8" is a formulation not coming within the scope of the present invention. It comprises, as percentage by weight, 22% of EVA, 9% of VLDPE and 6% of LLDPE-g-MA.

EXAMPLE 9 the composition entitled "DM9" is a formulation not coming within the scope of the present invention. It comprises, as percentage by weight, 27% of EVA, 4% of VLDPE and 2% of LLDPE-g-MA.

EXAMPLE 10 the composition entitled "DM10" is a formulation coming within the scope of the present invention. It comprises, as percentage by weight, 2% of EVA, 27% of VLDPE and 8% of LLDPE-g-MA.

EXAMPLE 11 the composition entitled "DM11" is a formulation not coming within the scope of the present invention, this composition comprising an excessively high percentage by weight of LLDPE. It comprises, as percentage by weight, 11% of EVA, 14% of VLDPE and 12% of LLDPE.

EXAMPLE 12 the composition entitled "DM12" is a formulation not coming within the scope of the present invention. It comprises, as percentage by weight, 22.75% of EVA, 9% of LLDPE and 5% of VLDPE-grafted-MA.

Tests Carried Out on the Materials:

The granules or components are shaped using a laboratory counterrotating twin-screw extruder of ThermoHaake Rheocord® System 40 type equipped with a flat die, the extruder being heated at 150° C. in order to obtain strips from which will be cut out the test specimens necessary in order to characterize or test the materials.

The first tests present the mechanical properties of the different test materials, in terms of elongation at break and of breaking stress, measured according to the standard ISO R527: 93-1BA, after conditioning these materials for 48 h in a medium exhibiting a relative humidity of 50% (RH=50).

The second test consists of a Shore D test according to the standard ISO 868, 15 seconds.

The third test consists of a hot pressure test at 80, 90 and 100° C. according to the standard NF EN 60811-3-1, 8.2, adapted to 20 mm×20 mm×2 mm samples with a weight of 136 g (strip included), everything being placed in an oven for two hours.

The final test considers the limiting oxygen index (LOI), measured according to the standard ISO 4589-2.

All these tests are carried out conventionally by taking standard test specimens of identical shape for each test composition and by subjecting them to each test on a test bench, according to the definitions (shape, dimensions, test rates, calibration of the machine, accuracy of the appliances, and the like) given by the international standards and well known to a person skilled in the art.

Results of the Tests Carried Out on the Test Specimens of the Different Formulations:

With regard to the results shown in the table below, the test specimens DM2 to DM4 and DM11 are not satisfactory as their results over the whole of the tests carried out prove to be not very impressive, indeed even inadequate for the use envisaged.

As regards the test specimen DM1, the results overall of the tests are admittedly not too bad but this composition comprises four components (apart from optional additives), which renders it expensive, and the process for the manufacture thereof is more complex and longer.

Only the test specimens DM5 to DM10 are in accordance with a composition according to the invention. They exhibit satisfactory properties, with differences which make it possible to illustrate the respective preferred proportions of the different thermoplastic components.

Specifically, it should be noted that these tests make it possible to identify favored ranges for the results, namely that the results of DM5 and DM6 are superior to those of DM7 or DM8, the latter being better than the results of the test specimens DM9 and DM10.

Generally, the following results for the different tests have to be obtained in order for a composition to be satisfactory in the application envisaged:

The elongation at break has to be ≥150%, preferably ≥200% and more preferably ≥250%.

The breaking stress has to be ≥10 MPa (MegaPascal), preferably ≥1 MPa and more preferably ≥12 MPa.

The Shore D measurement (unitless), well known to a person skilled in the art, has to be ≤41.

The result of the hot pressure test, also well known to a person skilled in the art, has to be ≤50% at 80° C., preferably ≤50% at 90° C. and more preferably ≤50% at 100° C.

|  | DM1 | DM2 | DM3 | DM4 | DM5 | DM6 | DM7 | DM8 | DM9 | DM10 | DM11 | DM12 |
| --- | --- | --- | --- | --- | --- | --- | --- | --- | --- | --- | --- | --- |
| EVA content (%) | 19 | 23 | 23 | 19 | 19 | 15 | 12 | 22 | 27 | 2 | 11 | 22.75 |
| VLDPE content (%) | 10 | 10 | 14 | 14 | 14 | 18 | 22 | 9 | 4 | 27 | 14 | — |
| VLDPE-g-MA content (%) | 4 | 4 | — | — | — | — | — | — | — | — | — | — |
| LLDPE content (%) | 4 | — | — | 4 | — | — | — | — | — | — | — | 9 |
| LLDPE-g-MA content (%) | — | — | — | — | 4 | 4 | 3 | 6 | 2 | 8 | 12 | 5 |
| Elongation at break (%) | 251 | 276 | 138 | 145 | 270 | 292 | 285 | 214 | 165 | 312 | 245 | 201 |
| Breaking stress (MPa) | 10.3 | 11.4 | 8.2 | 9.3 | 12.8 | 12.1 | 11.5 | 13.3 | 11.5 | 10.5 | 13.5 | 13.8 |
| Shore D | 41 | 40 | 40 | 41 | 41 | 40 | 39 | 43 | 45 | 44 | 48 | 51 |
| Hot Pressure Test (%) 80° C. | 8 | 100 | 100 | 5 | 3 | 8 | 15 | 0 | 36 | 0 | 0 | 0 |
| Hot Pressure Test (%) 90° C. | 25 | 100 | 100 | 21 | 18 | 26 | 43 | 9 | 67 | 2 | 1 | 0 |
| Hot Pressure Test (%) 100° C. | 49 | 100 | 100 | 35 | 26 | 45 | 68 | 17 | 100 | 17 | 7 | 3 |
| LOI (%) | 35.1 | 35.6 | 35.3 | 35.4 | 35.8 | 35.2 | 35.6 | 35.1 | 35.3 | 35.8 | 35.9 | 36.9 |

The invention claimed is:

1. A halogen-free fire-retardant thermoplastic composition consisting of:
   50% to 75% by weight of fire-retardant filler, wherein the fire-retardant filler is one or more selected from the group consisting of aluminum trihydroxide and magnesium dihydroxide;
   0.1% to 45% by weight of a copolymer consisting of ethylene and vinyl esters of saturated carboxylic acid monomers;
   only one non-functionalized very-low-density polyethylene (VLDPE) having a density between 0.85 and 0.91, present in an amount of 10% to 25% by weight;
   0.1% to 10% by weight of a linear low-density polyethylene (LLDPE) having a density greater than 0.91, wherein the LLDPE is grafted with maleic anhydride grafts present on its main chain,
   optionally up to 10% by weight of additives,
   wherein the additives are chosen from antioxidants, UV stabilizers, antistatic agents, inorganic fillers, coloring pigments, zeolites, anti-dripping agents and/or plasticizers,
   wherein the composition has following characteristics:
   elongation at break is ≥200%, measured according to the standard ISO R527; and
   breaking stress of the composition is ≥10 MPa, measured according to the standard ISO R527.

2. The composition of claim 1, wherein the linear low-density polyethylene (LLDPE) is between 2.5% and 7% by weight of the composition.

3. The composition of claim 1, wherein the non-functionalized very-low-density polyethylene (VLDPE) represents at most 20% by weight of the composition.

4. The composition of claim 1, wherein the vinyl esters of saturated carboxylic acid comprises from 3 to 20 carbon atoms.

5. The composition of claim 1, wherein the fire-retardant fillers represent more than 60% by weight of the composition.

6. A cable or pipe comprising at least two layers, at least one layer of which is formed by the thermoplastic composition of claim 1.

7. The composition of claim 1, wherein the anti-dripping agents are based on a silicone or fluorinated product.

8. A halogen-free fire-retardant thermoplastic composition consisting of:
   50% to 75% by weight of fire-retardant filler, wherein the fire-retardant filler is one or more selected from the group consisting of aluminum trihydroxide and magnesium dihydroxide;
   0.1% to 45% by weight of a copolymer consisting of ethylene and vinyl esters of saturated carboxylic acid monomers;
   only one non-functionalized very-low-density polyethylene (VLDPE) having a density between 0.85 and 0.91, present in an amount of 10% to 25% by weight;
   0.1% to 10% by weight of a linear low-density polyethylene (LLDPE) having a density greater than 0.91, wherein the LLDPE is grafted with maleic anhydride grafts present on its main chain, and
   wherein the composition has following characteristics:
   elongation at break is ≥200%, measured according to the standard ISO R527; and
   breaking stress of the composition is ≥10 MPa, measured according to the standard ISO R527.

* * * * *